United States Patent Office 3,228,896
Patented Jan. 11, 1966

3,228,896
METHOD OF MAKING MICROPOROUS POLY-
OLEFIN ARTICLES AND PRODUCT THERE-
FROM
Peter J. Canterino, Clifton, N.J., and Lewis V. Fouts,
Bartlesville, Okla., assignors to Phillips Petroleum
Company, a corporation of Delaware
No Drawing.    Filed May 16, 1961, Ser. No. 110,362
6 Claims.   (Cl. 260—2.5)

This invention relates to modified polyolefin compositions and to the production of microporous thermoplastic articles. In accordance with one aspect, this invention relates to the plasticization of modified solid monoolefin polymers. In accordance with another aspect, this invention relates to the production of microporous articles from plasticized solid monoolefin polymers.

In recent years, many different types of polymers have been developed and are now in wide scale commercial use. Also, various polymerization processes have been developed for the manufacture of high density polyolefins such as polyethylene, polypropylene, as well as copolymers of ethylene with higher monoolefins in the presence of various catalyst systems. It is well recognized in the art that the high density polyolefins are extremely difficult to plasticize. Although certain plasticizers are compatible with such polymers in the molten state, the polymer tends to crystallize out on solidifying and exudes the plasticizer. Thus, if one could satisfactorily plasticize such polymers in a manner so that the plasticizer is maintained within the solid polymer, compositions would then be available having greater extrudability for the formation of films and other molded articles.

Also, the high density polyolefins have found wide utility in the molding art and thus formed into such items as dishes, bottles, films and the like; also these polymers are useful in many applications to prevent the transmission of water vapor since these polymers have very low permeabilities. However, on the other hand, if one could form porous materials or articles from such polyolefins, even broader fields of application for such materials would be available.

This invention provides a novel plasticized polyolefin composition, a novel porous polyolefin composition, and a method of production thereof.

Accordingly, an object of this invention is to provide plasticized thermoplastic polymeric compositions comprising modified monoolefin polymers.

Another object of this invention is to provide polyolefin compositions of high extrudability.

Another object is to provide a method of plasticizing modified solid monoolefin polymer compositions.

A further object of this invention is to provide a method for forming porous articles from polyolefins.

A still further object of this invention is to provide porous, paper-like products from polyolefins.

Other aspects, objects and the several advantages of the invention are apparent from a study of the disclosure and the appended claims.

According to the invention, a polyolefin composition having improved extrudability and molding properties, i.e., substantially a non-bleeding composition, is obtained by blending a polyolefin resin, that has been modified by reacting it with a suitable polymerizable vinylidene monomer under polymerization conditions, with a minor proportion, sufficient to plasticize said polyolefin, of a plasticizing material such as a material selected from the high-boiling esters, and high-boiling polymers.

Further, according to the invention, novel porous polyolefin products are prepared by contacting a plasticized modified polyolefin composition, such as set forth above, after molding, with a solvent under extraction conditions such that the plasticizer as well as certain other materials are selectively removed from the molded composition, thus leaving the porous molded material as a product of the process.

According to this invention, solid 1-olefin polymers are first modified or graft polymerized by coating the polymer, preferably a high surface area form of the polymer, with a polymerizable liquid monomer together with a polymerization catalyst, thereafter subjecting the resulting mixture to polymerization conditions, and then admixing the reaction product with a selected plasticizer to provide a composition having improved properties. Broadly speaking, solid homopolymers of 1-olefins containing from 2 to 8 carbon atoms, inclusive, as well as copolymers of these 1-olefins with each other can be employed according to the invention. Suitable solid monoolefin polymers that can be employed include the high density and the low density polyethylenes, polypropylene, ethylene-propylene copolymers, ethylene-1-butene copolymers, and the like.

The polyolefins or 1-olefin polymers that can be modified and subsequently plasticized according to the invention can be prepared by any of the well-known methods which are usually employed in the preparation of these polymers. One well known method for preparing polymers of 1-olefins is the chromium oxide-catalyzed polymerization described in the Hogan et al. patent, U.S. 2,825,-721 (1958). The polyolefins prepared by Hogan et al. are characterized by their high density, and polymers of ethylene including homopolymers and copolymers prepared by this method generally having a density ranging from 0.920 to 0.990, ordinarily 0.930 to 0.970.

In addition to the foregoing method of preparing the 1-olefin polymers, especially polymers of ethylene, the invention also includes within its scope the modification and subsequent plasticization of polyolefins prepared by polymerization in the presence of an organometal catalyst such as trialkyl aluminum in conjunction with a titanium halide or polyolefins prepared by the high pressure polymerization processes which employ oxygen, peroxide, or other oxygen carrier as a catalyst.

The polymerizable vinylidene monomers that can be used for modifying polyolefins or graft polymerization onto polyolefins can be defined as compounds containing a terminal vinylidene (H₂C=C<) group, which preferably have a molecular weight in excess of 40, and which are liquid under the conditions of operation. These monomers can be further defined as compounds of the general structural formula

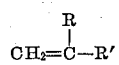

in which R is hydrogen, chloro or alkyl groups containing from 1 to 3 carbon atoms and R' is a radical selected from alkyl, aryl, alkaryl, aralkyl and cycloalkyl groups containing from 1 to 10 carbon atoms,

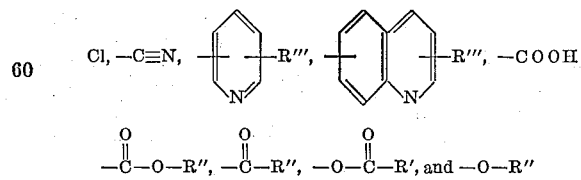

wherein R" is an alkyl, aryl, alkaryl, aralkyl, or cycloalkyl radical containing from 1–10 carbon atoms and wherein R''' is H or an alkyl radical containing from 1–3 carbon atoms. Generally, the total carbon atoms in R+R' is not more than 10 carbon atoms.

Typical compounds of this formula include propylene, styrene, alpha-methyl styrene, alpha-chlorostyrene, acrylic acid, methacrylic acid, acrylonitrile, methyl acrylate, methyl methacrylate, butyl acrylate, butyl methacrylate, vinyl acetate, 1-butene, vinylpyridine, vinylquinoline, cyclohexyl methacrylate, isobutylene, methyl vinyl ether, vinyl naphthalene, vinylidene chloride, and the like. High boiling monomers such as n-decyl or cyclohexyl methacrylate are particularly applicable when the polymerization is effected in an extruding device as described in copending application of Canterino et al., Serial No. 23,629, filed April 21, 1960, now Patent No. 3,102,050.

Polymerization catalysts suitable for use for these monomers include those of the free radical type such as benzoyl peroxide, dicumyl peroxide, tert-butylbenzene hydroperoxide, potassium persulfate, and the like. In addition, ionic polymerization catalysts of the Friedel-Crafts type such as aluminum chloride, boron fluoride, and the like are applicable when the monomer used is an isoolefin as isobutylene.

The polyolefins which are to be modified preferably are in the form of a powder or porous particles or crumb in order that a high surface area is presented on which the monomer is adsorbed or coated. Polyolefins ground by a micropulverizer or similar device, for example, particles of 40 mesh to 200 mesh (U.S. standard sieve), particles of polymer formed in a catalyzed process at a temperature below the solution temperature of the polymer, sometimes referred to as "particle form" polymer (10–200 mesh particles—U.S. standard sieve), and so-called polymer fluff are suitable for use in the invention.

Thus, in actual operation one or more of the polyolefins is contacted with one or more liquid monomers of the above group in the presence of a polymerization catalyst and under conditions such that graft polymerization or surface modification of the polymer is effected. A frequently preferred method of operation comprises dissolving from 0.01 to 3.5 weight percent of the catalyst in the monomer prior to application to the polyolefin. Alternatively, the catalyst can be applied to the polyolefin prior to wetting with the monomer. The wetting step is preferably at a temperature and pressure such that the monomer is in a liquid state.

Application of the monomer to the polyolefin can be made by any suitable means. A convenient method is to tumble the polymer in a drum as the monomer is added, continuing the tumbling until homogenous distribution is effected. The amount of monomer used will be in the range between about 1.0 and about 100 weight percent based on the polyolefin. Also, operations should be conducted under conditions such that the monomer remains in the liquid phase, using pressure if necessary. Polymerization conditions will be governed by the monomer-catalyst system used. The temperature range for the polymerization will be in the range between −150° F. and about 300° F. When operating with vinyl monomers and a free radical catalyst, polymerization can be effected in the temperature range between 0 and about 300° F. In any event, the temperature should be below the crystalline melting point of the polyolefin. The polymerization time will be in the range between about 0.5 minute and 100 hours.

According to the invention, at the end of the polymerization modification step, the polymeric product is admixed with a plasticizer, preferably at a temperature above the softening point of the polymer, but below the atmospheric boiling temperature of the plasticizer. Suitable plasticizing materials that can be employed according to the invention include the high-boiling esters, and high-boiling polymers. The plasticizers are preferably liquid at the temperature of incorporation or milling into the polymer and ordinarily have atmospheric boiling temperatures above about 350° F.

Representative specific examples of plasticizers that can be used include diisobutyl phthalate, diamyl phthalate, butyl octyl phthalate, butyl decyl phthalate, di-n-octyl phthalate, diisooctyl phthalate, diethyl phthalate, n-octyl n-decyl phthalate, triphenyl phosphate, cresyl diphenyl phosphate, tricresyl phosphate, tri(dimethylphenyl)phosphate, and diphenyl o-xenyl phosphate.

The modified polymer and plasticizer can be admixed by any suitable means so long as a homogeneous mixture is ultimately obtained. As indicated above, the plasticizer is preferably incorporated into the modified polymer mixture at a temperature above the polymer softening temperature, but at a temperature below which the plasticizer boils at atmospheric pressure. High density polyethylene, for example, has a softening temperature of about 250° F. and therefore, the temperature of incorporation of plasticizer will generally range from about 250° F. to about 350° F. for such a polymer although temperatures outside this range can be used when desired.

In the present process, blends of polyolefins or polyolefins onto which vinylidene monomers have been grafted are plasticized with one of the above-described materials. Generally, the mastication of the polymer with the plasticizer will be at a temperature such that the polyolefin is molten. Generally, the mastication will take place at a temperature ranging from 300° to about 550° F. Thus, any plasticizer should be compatible, to some degree, and should be liquid, but not boiling at the chosen mastication temperature. While superatmospheric pressure can be used to prevent evaporation, this would be fairly impractical.

The reaction product obtained from the above-described polymerization reaction can be plasticized as such or, if desired, the reaction product can be subjected to solvent extraction or other suitable treatment to remove certain components of the product. The reaction product obtained from the polymerization comprises a graft copolymer of a polyolefin and a vinylidene material as defined, some vinylidene homopolymer (some vinylidene copolymer if more than one monomer present) and some polyolefin which has not reacted with the vinylidene monomer(s).

The amount of plasticizer incorporated into the modified polymer will generally range from about 5 to about 50 parts per 100 parts of polymer when no filler is employed. If fillers are employed, the amount of plasticizer can be as high as 100 parts per 100 parts of modified polymer. The preferred range of plasticizer is from 10 to about 40 parts per 100 weight parts of modified polymer. The amount of filler or reinforcing agent employed will ordinarily range from about 10 to about 200 weight parts per 100 weight parts of modified polymer. Examples of suitable fillers or reinforcing agents that can be compounded into the polymer along with the plasticizer include clay, carbon black, silica, and the like. If pigments are to be used, only very small amounts are necessary to obtain intense coloration of the plasticized modified polymer.

The plasticized modified polymers of this invention are useful as film resins, and are much more expensive than other film resins because of the extending effect obtained with the plasticizer. Modified polymeric materials which have been extended with asphalt, for example, are useful for agricultural purposes due to their black color and can be employed for covering crop fields to obtain a heat insulating effect. These materials are also useful in building construction. Plasticized modified polymers of this invention can also be foamed, and both the foamed and unfoamed materials can be converted to fire-retardant insulating materials by incorporating therein, for example, chlorinated waxes and antimony oxychloride.

Also, according to the invention microporous polyolefin products are produced from plasticized molded modified polyolefin compositions, such as described above, or plasticized molded blends of polyolefins with vinylidene polymers, by contacting same with a suitable solvent under extraction conditions such that the plasticizer and/or the vinylidene polymer are selectively dissolved out of the molded composition, thus leaving a microporous polyolefin article as a product of the process.

The solid polymers of 1-olefins that can be employed in the blends with vinylidene polymers include the high and low density polyethylenes, polypropylene, ethylene/propylene and ethylene/1-butene copolymers, and the like, as described above. Broadly speaking, solid homopolymers and copolymers of 1-olefins containing from 2 to 8 carbon atoms can be employed. The vinylidene polymers that can be blended with the above-described solid polyolefins are polymers of monomers which contain a terminal vinylidene group and have a molecular weight preferably in excess of 40 such as described above.

Following plasticization of a modified polyolefin composition, such as described above, or a blend of an unmodified polyolefin with a vinylidene polymer, the composition is pressed, for example, at a temperature above the softening point of the polyolefin in the composition to form films or other relatively thin sections. The formed material is then rapidly quenched to a temperature below the softening point of the polyolefin so as to maintain the polyolefin uniformly dispersed in the composition. If quenching is not carried out as rapidly as possible, the molten polyolefin comes to the surface of the film and forms an impervious layer on the surface of the film when it is subsequently quenched or cooled.

Following the formation of the formed thin sections or films of plasticized polyolefin compositions, these sections are extracted at a temperature generally below 100° F. with a solvent, e.g., by immersion in the solvent for a period of time which will dissolve the plasticizer and vinylidene polymer present in the composition. When blends of polyolefins and vinylidene polymers are used, the vinylidene polymers and plasticizer are extracted out of the composition and only the polyolefin will remain in the composition as the porous product. If graft polymers are used, the vinylidene polymer will be extracted out along with the plasticizer leaving only the graft polymer as a porous product.

Representative examples of suitable solvents that can be employed to effect this selective removal of the plasticizer and/or vinylidene homopolymer includes chloroform, toluene, benzene, and the like. The particular solvent which is chosen will depend upon whether a graft polymer or blended polymer is used, the vinylidene homopolymer present, and the plasticizer which is used. Generally, the amount of solvent which is used will be sufficient to completely immerse the pressed film or other shape in the solvent. The time required for the extraction of the thin sections will vary over relatively wide ranges but will generally be within the range between 0.5 minute and 1,000 hours.

The polymeric material, after extraction, is a porous, paper-like product which has wide utility. This material can be printed on and can thus be used in packaging where permeability is desirable. Such material can also be used for decorative purposes such as wallpaper and the like.

A better understanding of the invention will be obtained upon reference to the following illustrative examples which are not intended, however, to be unduly limitative of the invention.

EXAMPLE I

A series of runs was made in which a high density polyethylene was graft polymerized with styrene and the resulting graft polymer was plasticized with diisobutyl phthalate.

The polyethylene which was employed in these runs was prepared by a chromium oxide-catalyzed solution polymerization, using cyclohexane as the solvent. The polymer had a density of 0.960 and a melt index of 1.2.

The graft polymer was prepared by placing 100 grams of the above-described polyethylene, in finely divided form (approximately 100 mesh), in a polyethylene bag. Fifty grams of styrene, to which had been added 0.5 gram of benzoyl peroxide, was then sprayed on the polyethylene. The resulting mixture was then placed in a screwcap jar, closed and placed in an oven at 158–176° F. overnight. The temperature was then raised to 230° F. for 2 hours to insure complete polymerization.

This graft polymer was then plasticized with various amounts of diisobutyl phthalate. The plasticizer was milled in on a rubber mill and the properties of the plasticized polymer were then determined. The results of these runs are expressed below as Table I.

*Table I*

| DIBP [1] g./100, graft polymer | 0 | 20 | 40 | 60 | 80 |
|---|---|---|---|---|---|
| PROPERTIES | | | | | |
| MI, 190° C. [2] | 2.54 | 9.37 | 45.0 | ([5]) | Too high to run. |
| Hardness. Shore D [3] | 70 | 65 | .53 | 50 | 40. |
| Tensile yield, p.s.i. [4] | 3,328 | 2,760 | 1,029 | 1,239 | Tacky. |
| Elongation at break [4] | 5 | 2 | 5 | 10 | |

[1] Diisobutyl phthalate.
[2] ASTM D1238–57T, Procedure E.
[3] ASTM D676–49T.
[4] ASTM D638–58T.
[5] Not measured.

EXAMPLE II

A graft polymer was prepared by the method of Example I except that the polyolefin used was an ethylene/butene copolymer which was prepared by a chromium oxide-catalyzed polymerization in n-pentane at a temperature below the solution temperature of the polymer. This so-called "particle form" polymer (10–200 mesh) had a density of 0.95 and a melt index of 4.1 as determined by ASTM D1235–57T, Procedure F. In this run, 100 grams of the finely divided olefin copolymer was contacted with 50 grams of methyl acrylate in which was dissolved 0.5 gram benzoyl peroxide. The procedure, temperature and time were identical to Example I. The graft polymer was then plasticized with ester-type plasticizers, after which the properties of the plasticized polymers were determined. The results are expressed below as Table II.

*Table II*

| Plasticizer | Parts Plasticizer/ 100 parts graft polymer | Melt Index, @ 190° C.[3] | Shore D Hardness | Tensile Strength P.s.i.[4] | Elongation at Break Percent [5] | Tensile Impact, ft. lbs.[6] |
|---|---|---|---|---|---|---|
| DIOP [1] | 40 | 0.26 | 46 | 1,150 | 87 | 59.3 |
| TCP [2] | 40 | 0.07 | 43 | 1,120 | 226 | 61.3 |

[1] Diisooctyl phthalate.
[2] Tricresyl phosphate.
[3] ASTM D 1238–57T, Procedure E.
[4] ASTM D 676–49T.
[5] ASTM D 638–58T.
[6] By the method of ASTM D 256 except that the test strips are placed on edge.

EXAMPLE III

In another series of runs, styrene was graft polymerized onto high molecular weight ethylene/butene copolymer and the resulting graft polymer was plasticized with various amounts of asphalt. In these runs, the ethylene/butene copolymer was made by the particle form process of Example II. The copolymer used in Run 1 had a melt index (ASTM D1238–57T, Procedure F) of 1.38, while the copolymer used in the remaining runs had a melt index by the same procedure of 2.1.

The graft polymer was prepared by contacting 100 parts of the finely divided ethylene/butene copolymer with 50 parts of styrene containing 1% by weight, based on the styrene, of benzoyl peroxide. The procedure, times and temperatures used were the same as in Examples I and II.

After the graft polymer was formed, various amounts of paving grade asphalt were milled in on a rubber mill, and in some cases clay was added as a filler. The results of these tests are expressed below as Table III.

Table III

| Run No. | Parts Asphalt, 100 parts graft polymer | Clay Filler | Melt Index @ 190° C.[1] | Flexural Modulus, p.s.i. | Shore D Hardness | Tensile Strength Percent | Elongation at Break, Percent | Zero Strength Temperature. °F. | Tensile Impact foot-lb. |
|---|---|---|---|---|---|---|---|---|---|
| 1 | 40 | | [2]0.27 | | 58 | 1,530 | 26 | 218 | 13.52 |
| 2 | 40 | | 0.08 | 79,000 | 48 | 1,420 | 5 | 209 | 7.78 |
| 3 | 60 | | 0.07 | 68,000 | 54 | 1,170 | 8 | 214 | 5.41 |
| 4 | 80 | | 0.2 | 60,000 | 52 | 1,170 | 27 | 219 | 7.54 |
| 5 | 100 | | 0.79 | 33,000 | 45 | 850 | 43 | 186 | 11.49 |
| 6 | 60 | 60 | 0.18 | | | 1,403 | 7 | | 9.5 |
| 7 | 60 | 120 | [3]11.05 | | | 1,527 | 2 | | 9.16 |
| 8 (Control) | 60 | | [3]13.34 | 40,000 | 48 | 1,670 | 477 | 210 | 6.75 |
| 9 (Control) | 40 | | 0.15 | 84,000 | 53 | 1,080 | 5 | 215 | 40.10 |

[1] ASTM D1238–57T, Procedure E.
[2] ASTM D1238–57T, Procedure F.
[3] At 230° C.
[4] By method of Thomas, Injection Molding of Plastics, Reinhold Pub. Co., Page 504 (1947).

In the above runs, the plasticized polymers containing above 40 parts of asphalt and no filler were somewhat tacky. Much less tendency to bleed was noted when filler was used. In control run 8, 100 parts of the ethylene/butene copolymer was blended with 60 parts of asphalt, while in control run 9, 66 parts of the ethylene/butene copolymer, 40 parts of asphalt and 34 parts of commercial polystyrene (Dylene) were blended. Considerable bleeding was noted in both Runs 8 and 9.

EXAMPLE IV

In one run, 200 grams of ethylene/1-butene copolymer which was prepared by a chromium oxide-catalyzed polymerization was contacted with styrene and a polymerization catalyst to form a graft polymer. The polyethylene which was employed was a "fluff" material (approximately 100 mesh) resulting from solvent precipitation of polyethylene. The polyethylene had a density of 0.95 and a melt index of 1.2.

In forming the graft polymer, 200 grams of polyethylene and 100 grams of styrene containing 0.25 gram benzoyl peroxide were placed in a screw-cap jar which was then closed and placed in an air oven at 80° C. (176° F.) for 16 hours.

Fifty grams of the resulting graft polymer was then placed on a rubber mill and 20 grams of diisobutyl phthalate was milled in. The resulting polyolefin composition was then molded at 300° F. and immediately quenched with cooling water. The resulting film was then immersed in chloroform for 10 minutes, after which the extracted film was removed and dried. A porous, paper-like product resulted.

EXAMPLE V

In each of two runs, 200 grams of the ethylene/1-butene copolymer of Example IV and 100 grams of styrene containing 1 gram of benzoyl peroxide were charged to a screw-cap jar. The jar was then placed in an air oven at 80° C. (176° F.) for 16 hours, after which the temperature was raised to 110° C. (230° F.) for 2 hours. The products from these two runs were combined and the total yield of graft polymer was 596 grams.

Fifty grams of the above-prepared graft polymer and 20 grams of diisobutyl phthalate were milled together on a rubber mill until uniform. Three grams of this mixture was then hot pressed at 325° F. and the film was quenched immediately. This film was immersed in chloroform for 30 minutes, after which the film was removed, and the solvent evaporated off. The resulting material was a white permeable film of the appearance of filter paper.

A 2-inch diameter disc of this material was then cut out and the permeability of this material to liquid toluene was then determined by means of a moisture vapor cup. In this test, a sample of liquid toluene was placed in a cup and lid for the cup was fashioned out of the porous product. The cup was then inverted and the rate at which the toluene seeped through the porous material was measured. The results of these runs are expressed below in the form of a table.

PERMEABILITY TO LIQUID TOLUENE

| Time, minutes: | Grams toluene through |
|---|---|
| 0 | 0 |
| 23 | 2 |
| 64 | 4 |
| 133 | 9.5 |
| 208 | 15 |
| 283 | 20.5 |
| 362 | 25.5 |

EXAMPLE VI

Two hundred grams of the graft polymer of Example V was milled with 80 grams of diisobutyl phthalate, 50 grams of TiO$_2$ and a trace of red pigment. The resulting composition was pressed into a film by the method of Example V, quenched immediately, and then extracted 30 minutes at room temperature with toluene. A red, permeable, paper-like material was recovered.

EXAMPLE VII

One hundred grams of the ethylene/1-butene copolymer of Example IV, 25 grams of glacial methacrylic acid, 25 grams of styrene and 0.5 gram of benzoyl peroxide were charged to a screw-cap jar, and the closed jar was placed in an oven at 50° C. (122° F.). Fifty grams of the resulting graft polymer was then milled with 20 grams of diisobutyl phthalate. The resulting composition was then pressed into a film and rapidly quenched by the method of Example V. The resulting film was then extracted with toluene at room temperature for 72 hours. A permeable, paper-like film resulted.

EXAMPLE VIII

A series of runs was carried out in which styrene was graft polymerized onto high molecular weight ethylene/butene-1 copolymer, prepared by a chromium oxide-catalyzed polymerization. The graft polymers were then plasticized with various materials, after which the plasticized compositions were converted to porous material by extraction according to the process of this invention.

The copolymer utilized in this example had the following properties:

| | Ethylene/butene copolymer |
|---|---|
| Volatiles | 0.11 |
| Ash | 0.02 |
| Melt index [1] | 1.50 |
| Density | 0.943 |
| Izod impart, ft./lbs., (no break) | 10.29 |
| Flexural modulus | 151,000 |
| Tensile strength at yield, p.s.i. | 3,342 |
| Elongation, percent | 443 |
| ESC, hours [2] | 1,000 |
| Inherent viscosity | 3.71 |

[1] ASTM D 1238–57T, Procedure F.
[2] Environmental stress cracking.

In thes runs, 100 grams of the copolymer, 50 grams of freshly distilled styrene and 0.5 gram of benzoyl peroxide were charged to a one-quart jar. The jar was then capped and heated in an oven at 70° C. (158° F.) overnight. The jar was then placed in an oven at 100° C. (212° F.) for two hours.

Fifty grams of the above-prepared graft polymer, a fine granular material, was milled with 20 grams of dibutyl phthalate on a roll mill at 350° F. until homogeneous. This blend was labeled Sample A. Fifty grams of the graft polymer was milled with 50 grams of white mineral oil, boiling point approximately 700° F., at 350° F. until homogeneous. This blend was labeled Sample B.

Each of the above blends was then molded into 10 mil film at 350° F. and 5,000 p.s.i. The films were rapidly quenched with cooling water. The films were then extracted with chloroform for five minutes at room temperature. The results of these runs are expressed below at Table IV.

Table IV

| Sample-Run | Molding Time, sec. | Remarks |
|---|---|---|
| A-1 | 5 | Porous. |
| A-2 | 60 | More porous than A-1. |
| B-1 | 5 | Porous, leather-like, less porous than A-1 or A-2. |
| B-2 | 60 | Do. |

EXAMPLE IX

One hundred grams of the copolymer of Example VIII, 50 grams of styrene, and 0.5 gram of benzoyl peroxide were charged to each of three 1-quart wide-mouth jars. The jars were capped and shaken to soak the polymer with the styrene. The jars were then placed in a water bath at 80° C. (176° F.) and maintained at this temperature for 2 hours and 55 minutes, after which they were placed in an air oven and maintained at 70° C. (158° F.) for 12 hours. The polymer from these three jars was then combined, yielding 441 grams of polymer, inherent viscosity 2.46.

Two hundred grams of the above polymer was extracted with 1 liter of hot chloroform, then with 2 liters of hot benzene. The solvents were then evaporated off in a water bath, leaving the extracted polymer which was then dried in a vacuum oven at 70° C. (158° F.).

| Polymer | Weight, Grams | Inherent Viscosity |
|---|---|---|
| Extract | 55 | 0.44 |
| Raffinate | 144 | 3.66 |
| Untreated graft polymer | | 2.46 |

Portions of the untreated graft polymer, extracted and unextracted polymer were then plasticized, either alone or blended with additional amounts of the ethylene/butene copolymer, with dibutyl phthalate. The plasticizer was blended with the polymer by milling on a rubber mill at 350° F. Control runs with no plasticizer were also carried out, in which case milling was omitted. The polymers were then molded into 1/32-inch film by compression molding for 60 seconds at 350° F. and 5,000 p.s.i. The films were quenched with cooling water at the end of the 60-second molding period. The films were then extracted with chloroform for one hour at room temperature.

The results of the runs are expressed below as Table V:

Table V

| Run No. | Type and Amount of Polymer, Grams | | | | Grams Dibutyl Phthalate | Description of Extracted Films |
|---|---|---|---|---|---|---|
| | Copolymer | Untreated Graft Polymer | Extracted Graft Polymer | Raffinate Graft Polymer | | |
| 1 | 33.5 | | 16.5 | | 0 | Non-porous. |
| 2 | 33.5 | | 16.5 | | 20 | Porous. |
| 3 | | 50 | | | 0 | Non-porous. |
| 4 | | 50 | | | 0 | Do. |
| 5 | | 50 | | | 20 | Porous. |
| 6 | | | | 50 | 0 | Non-porous. |
| 7 | | | | 50 | 20 | Slightly porous. |
| 8 | | | 14 | 36 | 20 | Porous. |

The slight porosity of the polymer from Run 7 is an indication that the amount of vinylidene polymer (grafted styrene) present was too low in this run.

A 1¹⁵⁄₃₂-inch diameter disc was cut out of the 1/32-inch thick, porous film from Run 5 of the above run. This disc was placed in the base of a glass column in a manner such that aspirator vacuum could be applied below the film. The time required for 100 ml. of a test fluid to pass through the film under these conditions was then measured.

| Fluid | Time | Fluid | Time |
|---|---|---|---|
| Xylene | 2′30″ | Acetic Acid | 8′21″ |
| Chloroform | 2′55″ | Benzene | 3′50″ |
| n-Heptane | 1′8″ | Ethyl Ether | 1′34″ |
| n-Pentane | 1′13″ | n-Hexane | 1′17″ |
| MeOH | 1′30″ | n-Octane | 1′53″ |
| Water | 1′ | Acetone | 2′49″ |

EXAMPLE X

Two runs were carried out in which blends of the ethylene/butene copolymer of the preceding examples and polystryene were formed.

In these runs, the desired amounts of copolymer and polystyrene were charged to a Banbury and milled at approximately 400° F. until homogeneous. In one run, a 75/25 by weight blend of copolymer/styrene was made up, while the second blend was 50/50 blended. The blends were then molded into 1/32-inch slabs at 400° F. and 15,000 p.s.i., and rapid quenching with cooling water was used. The slabs were then soaked in xylene overnight at room temperature, after which the slabs were washed with chloroform and dried. The resulting material was white and flexible, with the appearance of white leather. The slab from the 50/50 blend passed 100 ml. of xylene in 2 minutes and 7 seconds by the test procedure of Example IX. The slab from the 75/25 blend did not pass xylene under the test procedure at water pump vacuum.

Although in chemical terminology the term "modified" when applied to a process involving a polymer may denote an operation in which the molecular structure of the polymer is altered, for example, by graft polymerization, in this specification and claims the term is used in a broader sense. The term "modified" as used herein includes an alteration of the molecular structure of the polymer as well as changes not involving an alteration of the molecular structure and combinations to the two.

As will be evident to those skilled in the art, many variations and modifications of this invention can be practiced in view of the foregoing disclosure. Such variations and modifications are clearly believed to come within the spirit and scope of the invention.

We claim:

1. A process for providing molded polymeric compositions of improved processing properties which comprises contacting a solid polymer selected from the group consisting of homopolymers of monoolefins having from 2 to 8 carbon atoms per molecule and copolymers thereof with each other with a polymerizable liquid vinylidene monomer of the general structure $$CH_2=\overset{H}{\underset{|}{C}}-R'$$

in which R' is an aryl radical containing from 6 to 10 carbon atoms in the presence of a polymerization catalyst under polymerization conditions to form a polymeric mixture consisting essentially of monoolefin polymer, vinylidene polymer and a graft copolymer of said vinylidene monomer and said monoolefin polymer, incorporating into said mixture from 5 to about 100 weight parts of a plasticizer and from 0 to about 200 weight parts of a filler per 100 parts of said mixture, said plasticizer being selected from the group consisting of diisobutyl phthalate, diamyl phthalate, dibutyl phthalate, butyl octyl phthalate, butyl decyl phthalate, di-n-octyl phthalate, diisooctyl phthalate, diethyl phthalate, n-octyl n-decyl phthalate, triphenyl phosphate, cresyl diphenyl phosphate, (tri-dimethylphenyl) phosphate, diphenyl o-xenyl phosphate, and tricresyl phosphate, molding said plasticized mixture into thin sections at a temperature above the softening temperature of said solid polymer, immediately quenching the molded mixture to a temperature below the softening temperature of said solid polymer so as to uniformly disperse said polymeric mixture in said composition, contacting said quenched material with a solvent selective for at least one of said plasticizer and said vinylidene polymer under extraction conditions such that at least one of said plasticizer and said vinylidene polymer are selectively dissolved out of said molded composition and recovering a microporous polymeric article as a product of the process.

2. The process according to claim 1 wherein said polymer is polyethylene and said vinylidene monomer is styrene.

3. The microporous article of claim 1.

4. A process for providing molded polymeric compositions of improved processing properties which comprises contacting a solid polymer selected from the group consisting of homopolymers of monoolefins having from 2 to 8 carbon atoms per molecule and copolymers thereof with each other with a polymerizable liquid vinylidene monomer of the general structure $$CH_2=\overset{H}{\underset{|}{C}}-R'$$

in which R' is a radical represented by —COOR" wherein R" is an alkyl radical having from 1 to 10 carbon atoms in the presence of a polymerization catalyst under polymerization conditions to form a polymeric mixture consisting essentially of monoolefin polymer, vinylidene polymer and a graft copolymer of said vinylidene monomer and said monoolefin polymer, incorporating into said mixture from 5 to about 100 weight parts of a plasticizer and from 0 to 200 weight parts of a filler per 100 weight parts of said mixture, said plasticizer being selected from the group consisting of diisobutyl phthalate, diamyl phthalate, dibutyl phthalate, butyl octyl phthalate, butyl decyl phthalate, di-n-octyl phthalate, diisooctyl phthalate, diethyl phthalate, n-octyl n-decyl phthalate, triphenyl phosphate, cresyl diphenyl phosphate, tri(dimethylphenyl) phosphate, diphenyl o-xenyl phosphate, and tricresyl phosphate, molding said plasticized mixture into thin sections at a temperature above the softening temperature of said solid polymer, immediately quenching said molded mixture to a temperature below the softening temperature of said solid polymer so as to uniformly disperse said polymeric mixture in said composition, contacting said quenched material with a solvent selective for at least one of said plasticizer and said vinylidene polymer under extraction conditions such that at least one of said plasticizer and said vinylidene polymer are selectively dissolved out of said molded composition, and recovering a microporous polymeric article as a product of the process.

5. The process according to claim 4 wherein said solid polymer polyethylene and said vinylidene monomer is methyl acrylate.

6. The microporous article of claim 4.

References Cited by the Examiner

UNITED STATES PATENTS

| | | | |
|---|---|---|---|
| 2,676,929 | 4/1954 | Duddy | 260—2.5 |
| 2,805,208 | 9/1957 | Roche | 260—2.5 |
| 2,834,746 | 5/1958 | Salyer et al. | 260—878 |
| 2,924,584 | 2/1960 | Wolinski | 260—878 |
| 2,947,718 | 8/1960 | Rugg et al. | 260—878 |
| 2,980,964 | 4/1961 | Dilke | 260—31.8 |
| 3,020,597 | 2/1962 | Smith-Johannsen | 260—2.5 |
| 3,027,346 | 3/1962 | Rugg et al. | 260—878 |
| 3,102,050 | 8/1936 | Canterino et al. | 260—878 |
| 3,132,027 | 5/1964 | Norton et al. | 260—33.6 |

FOREIGN PATENTS

| | | |
|---|---|---|
| 611,642 | 11/1948 | Great Britain. |
| 884,731 | 12/1961 | Great Britain. |
| 1,170,326 | 9/1958 | France. |
| 1,193,104 | 4/1959 | France. |

OTHER REFERENCES

Buttrey: "Plasticizers," 2nd edition, Cleaver-Hume Press Ltd., 1957, page 64.

Raff et al.: "Polyethylene," volume XI, Interscience Publishers, Inc., New York, 1956, page 239.

MURRAY TILLMAN, *Primary Examiner.*

LEON J. BERCOVITZ, *Examiner.*